United States Patent [19]

Fitz

[11] 3,860,864

[45] Jan. 14, 1975

[54] POWER SUPPLY CIRCUITS

[75] Inventor: Philip John Fitz, Great Baddow, England

[73] Assignee: The Marconi Company Limited, Essex, England

[22] Filed: Sept. 17, 1973

[21] Appl. No.: 397,623

[52] U.S. Cl. .................. 321/18, 307/106, 320/1
[51] Int. Cl. ............................................ H02m 5/00
[58] Field of Search ................ 307/106, 108; 320/1; 321/18, 43, 44

[56] References Cited
UNITED STATES PATENTS

| | | | |
|---|---|---|---|
| 3,221,241 | 11/1965 | Greenberg et al. | 321/18 X |
| 3,518,526 | 6/1970 | Genuit | 321/18 X |
| 3,541,420 | 11/1970 | Rees | 320/1 |
| 3,541,421 | 11/1970 | Buchman | 321/18 X |
| 3,551,786 | 12/1970 | Gulik | 321/18 X |
| 3,621,274 | 11/1971 | Plond | 307/106 |

Primary Examiner—R. N. Envall, Jr.
Attorney, Agent, or Firm—Baldwin, Wight & Brown

[57] ABSTRACT

A power supply circuit including a charge storage device, a pulse generating circuit which charges the device incrementally and a level detector circuit for preventing the further supply of charging pulses when the voltage across the device reaches a predetermined level. The charge storage device may be a capacitor or a pulse forming network.

4 Claims, 3 Drawing Figures

FIG. I.

POWER SUPPLY CIRCUITS

This invention is concerned with power supply circuits and in particular with circuits for feeding a high, steady, d.c. voltage, for example of the order of tens of kilovolts, to a pulsed load.

Known circuits used in such an application comprise a charge storage means, such as a capacitor or a pulse forming network and an associated charging circuit. The capacitor is discharged by the pulsed load and recharged by the charging circuit to a predetermined level. The requirements of the charging circuit are that it should recharge the capacitor between pulses accurately to the same predetermined level despite any variation in the current supply to the charging circuit, in the output current taken by the load and in the repetition rate of the output pulses.

In order to meet these requirements, there has been proposed a combination of a linear "active" stabilizer, for removing low frequency changes and a passive filter for removing high frequency components. The stabilizer bandwidth is limited by loop instabilities, especially if the power supply is a chopping type of circuit. Hence, only relatively low frequency components can be reduced to an acceptable level and it is necessary to provide a large passive filter to reduce the remaining variations.

According to the present invention, there is provided a power supply circuit for feeding a steady d.c. voltage to a load, comprising charge storage means, pulse generator means for supplying charging current pulses to the charge storage means and level detector means operative to inhibit the further supply of charging pulses to the charge storage means when the stored charge attains a predetermined level.

The invention will now be described further, by way of example, with reference to the accompanying drawings, in which.

Figure 1:
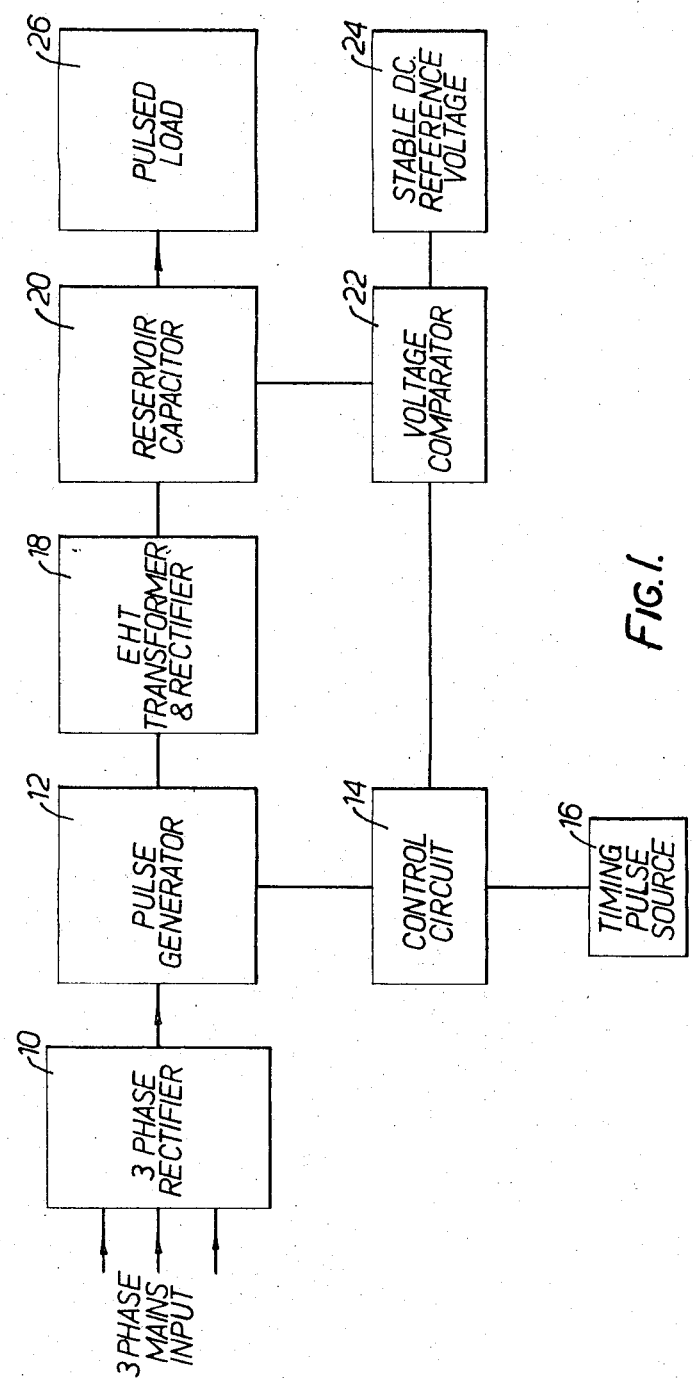
FIG. 1 is a schematic block circuit diagram of a power supply in accordance with the invention.

A three phase rectifier 10 is connected to a mains supply and produces a rectified d.c. signal which is supplied to a pulse generator 12. It is not necessary that the rectified mains should be smoothed prior to application to the pulse generator. The pulse generator is controlled by a pulse generator drive and control circuit 14 which in turn is connected to a source of timing signals 16. The output of the pulse generator 12 is applied to an EHT transformer and rectifier 18 whose output pulses charge a reservoir capacitor 20. The voltage across the capacitor is stabilized by means of a feedback loop including a voltage comparator 22 which compares a signal derived from the voltage across the reservoir capacitor 20 with voltage of a stable d.c. reference voltage source 24 and feeds a signal into the control circuit 14 to stop the further charging of the reservoir capacitor when its desired voltage is reached.

The described arrangement operates as follows:

The pulse generator 12 which may be a chopper circuit produces a series of pulses which are stepped up by the transformer 18 and applied to the reservoir capacitor 20. In this way a charge is built up in the capacitor 20 incrementally and when the voltage across the capacitor reaches a predetermined level the two signals applied to the comparator 22 will be equal and the further charging of the capacitor is prevented by the application of a signal to the control circuit 14.

The capacitor 20 will be discharged when it supplies power to the load 26, whereupon the pulse generator will again be controlled to apply charging pulses to the capacitor 20. If the reaction time of the feedback loop consists of the voltage comparator 22 and the control circuit 14 is less than the duration of one pulse then the stability of the output voltage is equal to the incremental change in voltage brought about by one charging pulse. Assuming it takes N pulses to charge the capacitor to the desired level, then the stability is proportional to 1/N. It is thus possible, by suitably choosing 'N', to form a very stable supply with a bandwidth extending up to the pulse repetition rate of the pulsed load. The supply is maintained substantially constant regardless of variations in the input power so that the latter supply need not be stabilized.

Figure 2:
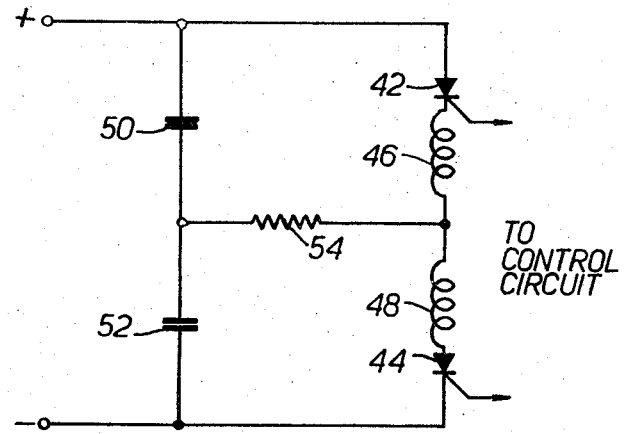
FIG. 2 is a circuit diagram of a pulse generator suitable for use in the power supply of FIG. 1.

A suitable form of pulse generator will now be described with reference to FIG. 2.

This drawing shows a known form of series inverter comprising two thyristors 42 and 44, two inductances 46 and 48, capacitors 50 and 52 and a load resistance 54 connected as illustrated. A d.c. supply is connected across the capacitors 50 and 52 with the indicated polarity. Pulses are supplied sequentially to the trigger electrodes of the thyristors 42 and 44 by the control circuit 14. When a pulse is first applied to the thyristor 42 a current flows through the inductance 46 and the load resistance 54, and develops a charge across the capacitor 52. When the current around the loop drops to zero, thyristor 44 is fired and a current flows in the opposite sense through the resistor 54 and through the inductor 48 and the thyristor 44 and eventually will reduce to zero leaving capacitor 50 charged to twice the supply voltage. The thyristor 42 is again fired and the process is repeated each time increasing the magnitude of the voltage swing. The characteristics of the circuit components will limit the maximum voltage across the load resistance 54.

In the case where a capacitor is used as a reservoir the total charge is only decreased by a fraction of its magnitude where power is supplied to the load. In the case of a pulse forming network being used as a reservoir, the network is totally discharged each time current flows in the load. Consequently greater time is required to recharge the reservoir between application of a pulse to the load 26 and this can prove a disadvantage. If on the other hand, the charge stored in the pfn by each charging pulse is increased then the stabilization of the voltage is adversely effected.

Figure 3:
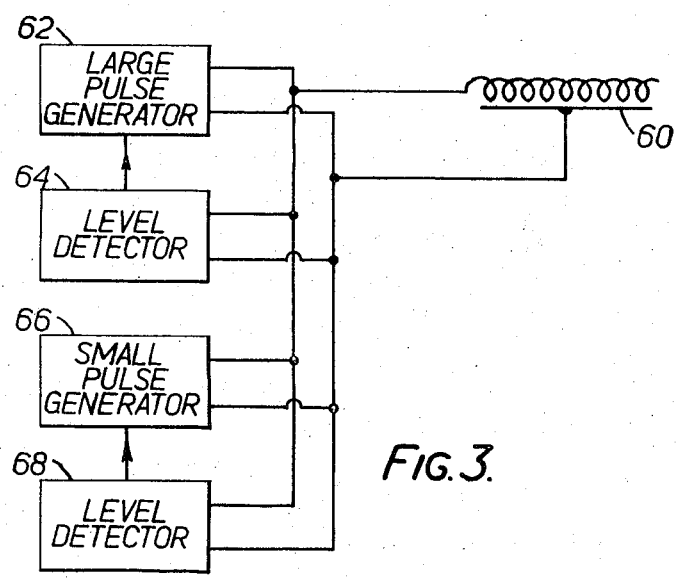
FIG. 3 is a more schematic block diagram of a power supply using a pulse forming network (pfn) as a means of charge storage.

To enable rapid charging and still provide good stability an arrangement as shown in FIG. 3 may be utilized. This drawing shows an arrangement containing a pfn 60 charged by a pulse generator 62 which is controlled by a level detector 64 sensitive to the voltage on the pfn 60. The blocks 62 and 64 are a condensed manner of representing the blocks 10, 12, 14, 16, 18, 22 and 24 of FIG. 1. Additionally connected to the pulse forming network 60 is a second pulse generator 66 and a second level detector 48 which are also constructed in the same manner as described with reference to FIG. 1. The two charging arrangements operate in parallel to effect respectively coarse adjustment and fine adjustment of the charge on the pfn. The first pulse generator 62 and level detector charge the pfn by application of large pulses so that the build up of charge is rapid. When the charge approaches the level of stabilization, the level detector 64 will prevent further charging of the pfn by the pulse generator 62 and the charge will now be built up by smaller increments by means of the pulses from the pulse generator 66 controlled by the level detector 68 which has a threshold nearer to the level of stability than the first level detector 64.

I claim:

1. A power supply circuit for feeding a steady d.c. voltage to a load, comprising charge storage means, pulse generator means for supplying charging current pulses to the charge storage means and level detector means operative to inhibit the further supply of charging pulses to the charge storage means when the stored charge attains a predetermined level; the pulse generator means comprising two sources of charging pulses; the charge storage means being a pulse forming network; and the level detector means including two circuits each sensitive to the stored charge attaining a respective predetermined level, one source of pulses acting in conjunction with one of the level detector circuits to effect coarse adjustment of the stored charge and the other source of pulses acting in conjunction with the second level detector circuit to effect fine adjustment.

2. A power supply circuit as claimed in claim 1 wherein the pulse generator means comprises a chopper circuit.

3. A power supply circuit as claimed in claim 1 wherein the pulse generator means comprises a series inverter.

4. A power supply circuit as claimed in claim 3 wherein the pulse generator means further includes a transformer for stepping up the magnitude of the output pulses of the series inverter and rectifier means for rectifying the stepped up pulses.

* * * * *